United States Patent
Staroveski et al.

(10) Patent No.: US 12,485,512 B2
(45) Date of Patent: Dec. 2, 2025

(54) APPARATUS FOR ACTIVE CONTACT FORCE CONTROL IN MACHINING AND HANDLING OPERATIONS

(71) Applicant: AMTOS SOLUTIONS d.o.o., Zagreb (HR)

(72) Inventors: Tomislav Staroveski, Zagreb (HR); Danko Brezak, Zagreb (HR); Miho Klaic, Dubrovnik (HR); Zlatko Catlak, Zagreb (HR)

(73) Assignee: AMTOS SOLUTIONS D.O.O., Zagreb (HR)

( * ) Notice: Subject to any disclaimer, the term of this patent is extended or adjusted under 35 U.S.C. 154(b) by 679 days.

(21) Appl. No.: 17/875,406

(22) Filed: Jul. 28, 2022

(65) Prior Publication Data

US 2022/0362898 A1    Nov. 17, 2022

Related U.S. Application Data

(63) Continuation of application No. PCT/EP2021/051847, filed on Jan. 27, 2021.

(30) Foreign Application Priority Data

Jan. 29, 2020 (HR) .............................. P20200144A

(51) Int. Cl.
*B23Q 15/18* (2006.01)
*B23Q 5/40* (2006.01)
(Continued)

(52) U.S. Cl.
CPC .............. *B23Q 15/18* (2013.01); *B23Q 5/40* (2013.01); *B23Q 11/0032* (2013.01); *B23Q 17/0966* (2013.01); *B23Q 17/2266* (2013.01)

(58) Field of Classification Search
CPC ...... B23Q 15/18; B23Q 5/40; B23Q 11/0032; B23Q 17/0966; B23Q 17/2266;
(Continued)

(56) References Cited

U.S. PATENT DOCUMENTS

| | | | |
|---|---|---|---|
| 5,327,790 A * | 7/1994 | Levin | ........................ B25J 9/12 73/862.321 |
| 9,636,827 B2 | 5/2017 | Sato | |

(Continued)

FOREIGN PATENT DOCUMENTS

| | | |
|---|---|---|
| CN | 105563309 B | 4/2019 |
| DE | 202014104735 U1 | 3/2015 |

(Continued)

OTHER PUBLICATIONS

JP-2017064836-A Machine Translation (Year: 2017).*
(Continued)

*Primary Examiner* — Jake Cook
(74) *Attorney, Agent, or Firm* — XSENSUS LLP

(57) ABSTRACT

An apparatus for active contact force control can have an upper flange on which to mount a production tool. The apparatus can be mounted, via a lower flange, on a multi-axis machine to obtain spatial motion together with the corresponding production tool. The apparatus can comprise a housing inside which can be a linear actuator connected to guides. Mechanical connection between a ball screw and the upper flange can contain a force sensor and at least one spherical joint. The connection between the spherical joint and the upper flange can be formed using a mechanical dissipative element made of elastic dissipative elements and a disc plate positioned between the elastic dissipative elements.

20 Claims, 2 Drawing Sheets

(51) Int. Cl.
   *B23Q 11/00*   (2006.01)
   *B23Q 17/09*   (2006.01)
   *B23Q 17/22*   (2006.01)
(58) Field of Classification Search
   CPC ...... B25J 13/085; B25J 19/068; B25J 9/1633; B25J 9/123; B25J 11/0065; B25J 15/0019; B25J 17/0275; F16H 25/2021
   See application file for complete search history.

(56) References Cited

U.S. PATENT DOCUMENTS

| | | |
|---|---|---|
| 9,796,082 B2 | 10/2017 | Choset et al. |
| 2010/0283340 A1* | 11/2010 | Fradella ............... H02K 7/025 310/90.5 |
| 2014/0005831 A1* | 1/2014 | Naderer ............... B25J 11/0065 700/258 |
| 2016/0089789 A1 | 3/2016 | Sato |
| 2019/0232502 A1 | 8/2019 | Naderer |
| 2022/0018416 A1* | 1/2022 | Kamikawa ........... B25J 19/0016 |

FOREIGN PATENT DOCUMENTS

| | | |
|---|---|---|
| EP | 2686142 B1 | 4/2015 |
| JP | 9-300114 A | 11/1997 |
| JP | 2017064836 A * | 4/2017 |

OTHER PUBLICATIONS

International Search Report and Written Opinion mailed on May 7, 2021, received for PCT Application PCT/EP2021/051847, filed on Jan. 27, 2021, 11 pages.

Mohammad et al., "Design of a force-controlled end-effector with low-inertia effect for robotic polishing using macro-mini robot approach", Robotics and Computer-Integrated Manufacturing, vol. 49, 2018, pp. 54-65.

Parker Hannifin, "The global leader in motion and control technologies", ETH Electro Cylinder, Parker, Dec. 2019, pp. 1-60.

* cited by examiner

APPARATUS FOR ACTIVE CONTACT FORCE CONTROL IN MACHINING AND HANDLING OPERATIONS

CROSS-REFERENCE TO RELATED APPLICATION(S)

The present application is a continuation of International App. No. PCT/EP2021/051847 filed Jan. 27, 2021, and also claims priority to Croatian Patent App. No. P20200144A filed Jan. 29, 2020. The entire content and disclosure of each of the foregoing applications is hereby incorporated by reference in its entirety.

FIELD present disclosure relates to an apparatus for the active control of the contact force in machining and handling operations.

PRIOR ART

In this short prior art review several typical technical solutions of the apparatuses for the active control of the contact force will be analyzed.

In the article published as "Mohammad, A. E. K., Hong, J., & Wang, D.: DESIGN OF A FORCE-CONTROLLED END-EFFECTOR WITH LOW-INERTIA EFFECT FOR ROBOTIC POLISHING USING MACRO-MINI ROBOT APPROACH, Robotics and Computer-Integrated Manufacturing, (2017) 49, 54-65, doi:10.1016/j.rcim.2017.05.011" authors describe and compare standard and advanced design of the apparatus for active force control. This paper introduces one of possible approaches in reducing production tool inertia, characterized with the tool drive positioned closer to the multi-axis machine, while linear actuator uses hollow rotor for the torque transfer to the production (polishing) tool. This document represents a general prior art.

A good overview of linear actuators and their standard attachments is given in the catalogue of the Parker Hannifin Co., which can be downloaded from the Parker Hannifin Co. website.

From this catalogue it is clear that axial force sensors, guides and alignment couplers around linear actuators, which are formed using a servomotor, a ball screw and a ball screw nut, represents industrial standard and a standard set of elements of already developed linear actuators. It should also be emphasized that in the said document the application of mechanical dissipative element (MDE) and spherical joints used for force measurements with higher accuracy are not mentioned in any way, regardless the fact that spherical joints and alignment couplers have many common structural elements and the technical field of their application slightly overlaps.

The German utility model published as DE202014104735 for: ELEKTROZYLINDER MIT EINER VORRICHTUNG ZUM ERFASSEN DER LAST, filed on behalf of the EUROSEI S R L, IT, discloses standard practice of axial positioning of the force sensor on the electric actuator driven by the servomotor and the ball screw.

The first applicable autonomous and useful apparatus for the active control of the contact force is disclosed in the EP patent published as EP2686142B1 for: ACTIVE HANDLING APPARATUS AND METHOD FOR CONTACT TASKS, filed on behalf of FerRobotics Compliant Robot Tech GmbH, AT. This technical solution is specific in the sense of utilization of the pneumatic-hydraulic actuator for the active control of the contact force, where it seems that the said actuator also represents the elastic element of the system used for the attenuation of rapid force oscillations. It should be noted that the cited document is not referring to the said technical problem, which is solved by the application of the pneumatic-hydraulic actuator; as it is stated in the first patent claim which quotes static-frictionless adjusting element, for example a pneumatic cylinder or a pneumatic muscle.

US patent application published as US2019/0232502A1 for: MACHINE TOOL FOR ROBOT-ASSISTED SURFACE FINISHING, of the same applicant—FerRobotics Compliant Robot Tech GmbH, AT describes an idea similar to the one presented in the article Mohammad, A. E. K. et al., mentioned here as the first reference, where it is suggested that the tool drive should be installed as close as possible to the connecting point with the multi-axis machine, e.g., robot. In the paragraph [0031] of the said patent application it can be noticed that the inventors prefer the application of pneumatic linear actuators over electric actuators, but do not exclude the use of the later. This document does not teach about the position sensor use, thereby assuming that the position is determined from the position of the multi-axis machine such as robot or robotic arm.

The US patent published as U.S. Pat. No. 9,796,082 for: SERIES ELASTIC ACTUATORS FOR ROBOTS AND ROBOTIC DEVICES, filed on behalf of the Carnegie Mellon University Center for Technical Transfer & Enterprise, US, teaches about the use of one or more mechanical elastic elements positioned between two metal rings used for the connection of the parts of multi-axis machines and amortization of the parts of robotic modules, especially in respect to torques during rotational motions. Although the active force control has been mentioned in this document, the document remains silent about the problems arising from such control approach. Furthermore, this document refers to a series of elastic actuators which are structurally completely different form MDE used in one or more embodiments of the present disclosure.

The US patent published as U.S. Pat. No. 9,636,827 for: ROBOT SYSTEM FOR PERFORMING FORCE CONTROL, filed on behalf of the applicant Fanuc Corporation, JP, teaches about the control of the apparatus for the active force control during machining. This document is specific, and, thereby, selected here in this review in a way that the force sensor and the position sensor are both installed in the apparatus disclosed in the said patent. There is no mention of the problem of axial force measurement and the need for MDE in the system.

In the case of US2019/0232502A1, a pneumatic approach may be preferred due to the problems which they have potentially identified in the application of electric actuators.

SUMMARY

The present disclosure relates to the apparatus for the active control of the contact force in machining and handling operations.

According to an aspect, the apparatus can comprise: an upper flange to mount a production tool to the apparatus, where, when mounted, the production tool acts with a predefined contact force on a workpiece surface in a production process; a lower flange on a housing of the apparatus to mount the apparatus via the lower flange on a multi-axis machine which performs a spatial motion of the apparatus and the production tool when mounted to the upper flange of the apparatus; and a linear actuator in the housing, the linear actuator including a ball screw and at least one ball screw lever connected as a sliding joint to at least one linear guide having a first end in the housing, where the at least one linear guide limits motion of the ball screw only for axial motion along a linear axis of the linear actuator, and where the at least one linear guide is connected at a second end of a sliding section thereof, using a first mechanical connection, to the upper flange. A second mechanical connection of the ball screw and the upper flange includes a force sensor to measure force by which the linear actuator is acting on the upper flange and thereby on the production tool. The second mechanical connection between the ball screw and the upper flange is formed based on a first spherical joint and a mechanical dissipative element between the force sensor and the upper flange, and based on a second spherical joint between the force sensor and the ball screw, where the first and second spherical joints are to eliminate any non-axial load in order to provide measurements of an applied axial force, produced by the linear actuator acting on the upper flange, using the force sensor. The mechanical dissipative element includes an upper elastic dissipator and a lower elastic dissipator, with a disc plate between the upper and lower elastic dissipators and mechanically connected to the first spherical joint, where the upper and lower elastic dissipators are fixed within the upper flange such that the disc plate, which is mechanically connected to the spherical first joint, is the only mechanical connection between the force sensor and the upper flange, and where the upper and lower elastic dissipators mechanically attenuate changes in contact force measured by the force sensor.

The upper flange of the said apparatus can be used for mounting a production tool which can act with the predefined contact force on the workpiece surface. With its lower flange, positioned on the housing, the apparatus can be mounted on the flange of the multi-axis machine which can perform a spatial motion of the apparatus and the installed production tool. The apparatus for contact force control can comprise:

a linear actuator, installed in the housing, with a ball screw which is with at least one ball screw lever connected, in the form of sliding joint, to at least one linear guide fixed with its one end in the housing and where the said linear guide or more such guides limit the ball screw motion only to the axial motion along the linear axis of the said linear actuator; where one or more guides are connected at the end of their sliding sections using mechanical connection to the upper flange; and where the mechanical connection of the ball screw and the upper flange additionally includes a force sensor which measures force by which a linear actuator is acting on the upper flange and, thereby, to the said production tool.

The apparatus can be characterized in that:

the mechanical connection between the ball screw and the upper flange is formed by positioning the first spherical joint and MDE between the force sensor and the upper flange, while other spherical joint is optionally positioned between the force sensor and the ball screw; where the role of spherical joints is to provide precise measurements of the applied axial force, produced by the linear actuator acting on the upper flange, using the force sensor in such a way to eliminate any non-axial load; and wherein the MDE comprises an upper elastic dissipative element and a lower elastic dissipative element with a disc plate positioned between them which is directly mechanically connected to the spherical joint, while both elastic dissipative elements are fixed within the flange in such a way that the disc plate, connected to the spherical joint, is the only mechanical connection between the force sensor and the upper flange; where the role of the elastic dissipative elements is to mechanically attenuate rapid changes in the contact force measured by the force sensor.

In the preferred embodiment, the apparatus is additionally equipped with the inertial measurement unit, attached to the housing, whose readings of the housing orientation are used to compensate the influence of the gravity in the active contact force control in real-time.

In one embodiment according to the present disclosure, the apparatus is formed using only the first spherical joint positioned between the force sensor and MDE installed in the flange.

In the preferred embodiment according to the present disclosure, the linear actuator is formed using an axially positioned servomotor which is equipped with an encoder and/or resolver for precise determination of the position and the rotational speed of a servomotor rotor. The rotor is mechanically connected to the ball screw nut and the ball screw inserted into the ball screw nut. The assembly comprised of the ball screw and the corresponding ball screw nut transforms rotational motion of the servomotor rotor into a linear motion of the ball screw, thereby transferring actuation force on the upper flange.

According to one embodiment of the apparatus, the servomotor is connected to the assembly comprised of the hollow ball screw and the ball screw nut which enables electrical wiring and/or hydraulic installations to be guided thereto, where later are used for operation and control of the production tool which requires contact force control and which is mounted on the upper flange of the apparatus.

In further embodiments, the apparatus for the active control of the contact force is equipped with the lower flange and eventually with an additional flange, which can optionally be attached and oriented in the radial direction to the housing. These types of flanges enable the mechanical connection of the apparatus with a multi-axis machine based on the predefined mounting angle between the apparatus main axis and the surface of a multi-axis machine flange.

Embodiments of the present disclosure can be intended, but without any limitations, to be used in production processes where the production tool belongs to the group comprised of a polishing tool, a grinding tool, a drilling tool, a milling tool, a sanding tool, a handling tool or a tool used in the electrochemical machining.

In one embodiment according to the present disclosure, under the term "multi-axis machine" a numerically controlled machine tool, a robot or a manipulator is implied.

DETAILED DESCRIPTION

Figure 1:
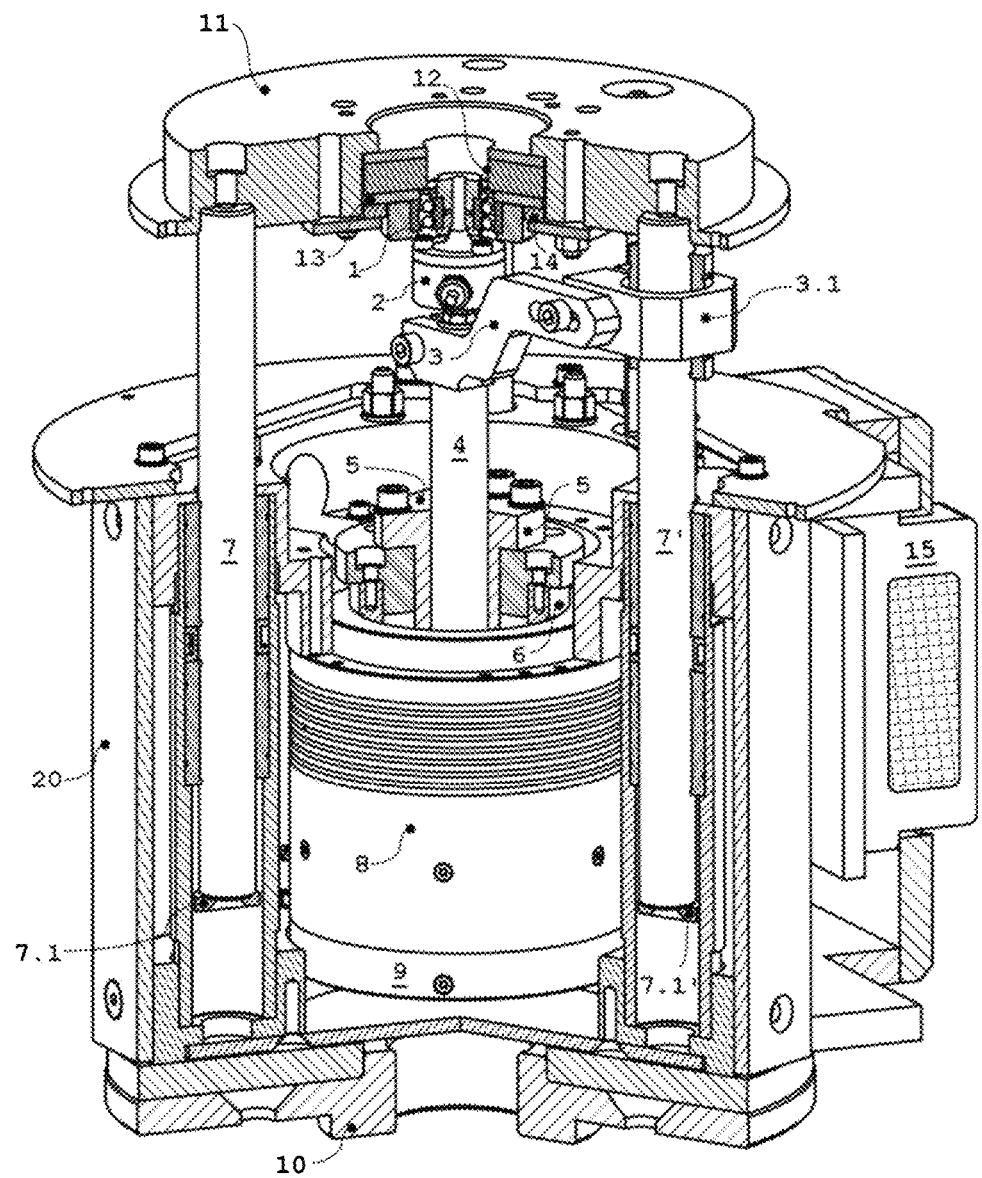
FIG. 1 depicts isometric view of the apparatus with the electric linear actuator and MDE, both shown in the form of partial section view.

Numerically controlled machine tools, robots or manipulators were the backbone of the industry 3.0 and are the irreplaceable segment of the new industry 4.0. Those machines perform very specific operations which, inter alia, include the problem of the active force control. This problem particularly occurs in operations characterized by the production tool belonging to the group of a polishing tool, a grinding tool, a drilling tool, a milling tool, a sanding tool, a handling tool or a tool used in the electrochemical machining. If in mentioned technical situations a production tool is directly mounted on the robots, robotic arms or other multi-axis machines, those machines would not be able to perform requested operations adequately. Their limitation in the active control of forces or other physical parameters in real time with the predefined accuracy is caused by the variations in workpiece surface geometry, position deviations caused by the workpiece clamping effect, inertia related to the machine geometry and limitations of the actuators. Moreover, it is also not possible to avoid or adequately attenuate undesired oscillations in the control loop. The problem may be solved by using an additional apparatus for the active force control in machining and handling operations, which can be positioned between the production tool and the flange of the multi-axis machine, e.g., a robotic arm. A purpose of such apparatus can be to precisely measure contact force of the production tool and, using the control loop, to adjust its value to some referent value defined according to the type of the machining operation.

It is reasonable to expect that such apparatus contains a linear actuator, formed as mechanical or an electrical type of actuator, which can be used for the force control, and one or more force sensors, axially positioned using mechanical joint, which can be used for measuring axial force applied during machining. The apparatus can have a certain control logic which is used to control contact force produced by the actuator using the sensor-actuator feedback relation. Due to the utilization of the mono-axial actuators and smaller physical dimensions of such apparatus, an average person skilled in the art would expect that all problems related to the precise force measurement, attenuation of the system oscillations and fast and accurate force reference following have been solved. However, the situation is completely different in the real industrial practice.

A first technical problem, which can be solved by one or more embodiments of the disclosed subject matter, is related to the precise measurement of the applied axial force using one force sensor. Simulation models as well as real technical applications have shown that direct mechanical connection: actuator spindle-force sensor-tool flange results in the occurrence of also non-axial forces. In order to obtain precise measurement of only axial force component applied to the production tool, one or two spherical joints can be implemented, according to one or more embodiments of the present disclosure. Their role can be to eliminate negative effects of non-axial loads, i.e., bending and torsional stresses, on the installed force sensor in the apparatus according to one or more embodiments of the present disclosure.

A second technical problem, which can be solved by one or more embodiments of the present disclosure, is related to the attenuation of rapid force oscillations in the control loop. Every control system with the feedback loop can achieve resonant state which is sometimes hard to predict. It should be pointed out that the apparatus according to one or more embodiments of the present disclosure can be constructed for a universal application and not just for a specific type of the production tool. For this reason, all components of the control loop, such as inertial masses and mechanical connections, may not be able to be adapted nor dimensioned in a way to attenuate undesired oscillations of the system. The said problem can arise in the case of machining operations of workpieces with uneven surfaces, such as curved or bended metal sheet surfaces used in automobile and other industries. In such cases, when the tool is excited by sudden changes in the surface curvature, an extreme force value followed by the significant time derivative of the force signal can occur. In order to protect force sensor from the overload damage and the control loop from receiving a series of information from the force sensor which are not useable for numerical data processing and which causes significant problems for the apparatus control logic, the mechanical connection has been modified. In the mechanical connection, according to embodiments of the disclosed subject matter: actuator spindle—force sensor—spherical joint, an additional element called—the mechanical dissipative element (MDE) is added. The role of MDE can be to mechanically attenuate rapid changes in the contact force measured by the force sensor and, thereby, to prevent system oscillations.

It should be noted that the modifications which arise from the first and the second problem can act synergistically on the active control of the contact force of this apparatus. This is manifested in higher speed of the production tool in the surface machining and in avoiding conflict situations in the control loop using longer sampling period needed for the precise contact force measurement during machining. It can be concluded that MDE can act as a low-pass filter within the control loop.

A third technical problem, which has been identified during the apparatus development process, is also related to the two previously mentioned problems. Due to the production process universality, it is hard to say what type of the tool will be mounted on the apparatus and what type of the multi-axis machine or robotic arm will carry the apparatus for the active control of the contact force. Furthermore, it can be that the position of the apparatus during the machining process also influences on the force sensor measurements. This can be specifically noticed in extreme situations such as during the continuous machining of the top and the bottom side of prismatic workpiece. The influence of the gravity on the system apparatus-tool is significant, and it may be necessary to compensate the influence of the gravity in the active contact force control in real-time, especially in cases were the ratio between the contact force and the tool weight is small. The position in the space of the system apparatus—tool can be possible to measure from the control system of the multi-axis machine or robotic arm which carries the said system. However, this often affects the autonomous program logic of the multi-axis machine so the extraction of the tool position and orientation in the space is not a simple process for a person skilled in the art. Moreover, those data are usually inaccessible (locked) to end user or cannot be fetched in an adequately short time interval. The need for such data extraction may make connection between the apparatus of one or more embodiments of the present disclosure and the multi-axis machine relatively complicated and reduce the said universality. This technical problem can be solved by using an autonomous inertial measurement unit which can provide information about the orientation of the apparatus for the active control of the contact force in the gravitational field. The said information can then be used to compensate the applied force in real time with respect to the tool weight.

All three of the above-discussed solutions can contribute jointly and synergistically to the versatility of application of the apparatus for the active control of the contact force and to its compactness and robustness during exploitation according to one or more embodiments of the present disclosure.

Moreover, it may be possible to redefine one or more of the technical problems, which can be solved by one or more embodiments of the present disclosure, as an upgrade of existing industrially applicable pneumatic systems, for instance, as mentioned in the above-discussed prior art, in a way to replace pneumatic actuators with the equivalent and more affordable electric actuators. However, in order to maintain or even enhance the quality of the response of the force control system and prevent occurrence of the undesired resonance, technical solutions from one or more embodiments of the present disclosure can be additionally implemented.

The apparatus, according to one or more embodiments of the present disclosure, can be attached with its one side to the multi-axis machine which performs a spatial motion of the apparatus and the production tool installed on the other side of the apparatus. The apparatus itself can actively control the production tool, i.e., the active force by which the tool is acting on the workpiece surface. Embodiments of the present disclosure can relate to manipulators, especially to programmable controlled manipulators characterized by the control logic used to adjust parameters such as forces or torques in combination with the tool position. The other field of embodiments of the present disclosure can relate to the control of numerically controlled systems or, to be more specific, robots or robotic arms used in the applications characterized with the active force control, or where the force is used as a reference.

Embodiments of the disclosed subject matter, described hereafter in details, can be formed in its preferred variant using the electric actuator. Such actuator, however, may be replaced with some other type of actuator, such as pneumatic or hydraulic actuator, if a need arises. In the cylindrically shaped housing (20), which could also be formed in some other shape, a servomotor (8) (e.g., RoboDrive Hollow Shaft Motor RDU85X13-HW STD VSS manufactured by the TQ Co.) with the integrated encoder and/or resolver (9) is installed. A role of encoder and/or resolver (9) can be to precisely measure rotational speed and position of a rotor (6) of the servomotor and to send those measured data to the control unit of the apparatus. In order to transform rotational motion of the rotor (6) into a linear motion, a ball screw (4) with a corresponding ball screw nut (5) can be implemented. Such assembly can reduce friction and can provide precise motion of the actuator. However, it is also possible to apply other technical solutions to transform rotational into linear motion with the similar technical effect. The selection of the ball screw (4), the ball screw nut (5), and the servomotor (8) can define the characteristics of this electric linear actuator, for instance, its speed, acceleration, scope—contact force, etc.

For a reliable force transmission from the linear actuator or, specifically, the ball screw (4) to the desired tool, other machine elements may also be needed. Embodiments of the present disclosure may be particularly suitable to be used with production tools which belong to the group comprised of a polishing tool, a grinding tool, a drilling tool, a milling tool, a sanding tool, a handling tool or a tool used in the electrochemical machining.

According to one or more embodiments of the present disclosure, the production tool can be mounted axially on the upper flange (11), e.g., using clamping bolts. At least one guide (7, 7') can be attached in its sliding section, using screw or in some other way, to the upper flange (11) as shown in FIG. 1, where the section view of the upper flange (11) is showing the attachment points. In their non-sliding sections, guides (7, 7') can be attached to the housing (20). A role of guides (7, 7') can be to compensate radial forces which may occur on the upper flange (11) during machining. According to a preferred embodiment, the ball screw (4) can be connected to at least one linear guide (7, 7') with the ball screw lever (3) in the form of sliding joint (3.1) which can enable independent movement of the sliding joint (3.1) along the guide (7'). This way, guides (7, 7') do not participate in the transfer of the axial force from the ball screw (4) to the upper flange (11). At the same time, the ball screw lever (3) can also be used to prevent the transfer of residual torque to the mechanical assembly with the force sensor (2).

The lower flange (10) of the apparatus according to one or more embodiments of the disclosed subject matter, which is used for mounting the apparatus on the multi-axis machine, can be positioned on the lower side of the housing (20). Regardless the fact that the lower flange (10) is shown in FIG. 1 as a disc, it can be also formed in a more complex way, e.g., as a hinge, which can enable fixation of such modified lower flange (10) to the multi-axis machine such that the mechanical connection is accomplished with the predefined mounting angle between the apparatus main axis and the surface of a multi-axis machine flange. In one variant an additional flange can be optionally attached and oriented in the radial direction to the housing (20). The flange may also provide a firm mechanical connection with the multi-axis machine based on the predefined mounting angle between the apparatus main axis and the surface of a multi-axis machine flange. As previously mentioned, the multi-axis machine according to one or more embodiments of the present disclosure can often imply a numerically controlled machine tool, a robot, or a manipulator.

With respect to the previously defined technical problems, it can be desirable to compensate the influence of the gravity in embodiments of the present disclosure. For this purpose, the inertial measurement unit (IMU) (15) can be attached to the outer side of the housing (20), such as shown in FIG. 1. A purpose thereof can be to precisely measure the gravity vector and to send this information to the apparatus control system to compensate the influence of the upper flange (11) and the tool weight, so that the desired final value of the actively controlled contact force could be achieved. This can arise in situations where the ratio between the contact force and the tool weight is relatively small. A BOSCH BNO055 is an example of an IMU that can be used in one or more embodiments of the present disclosure.

Figure 2:
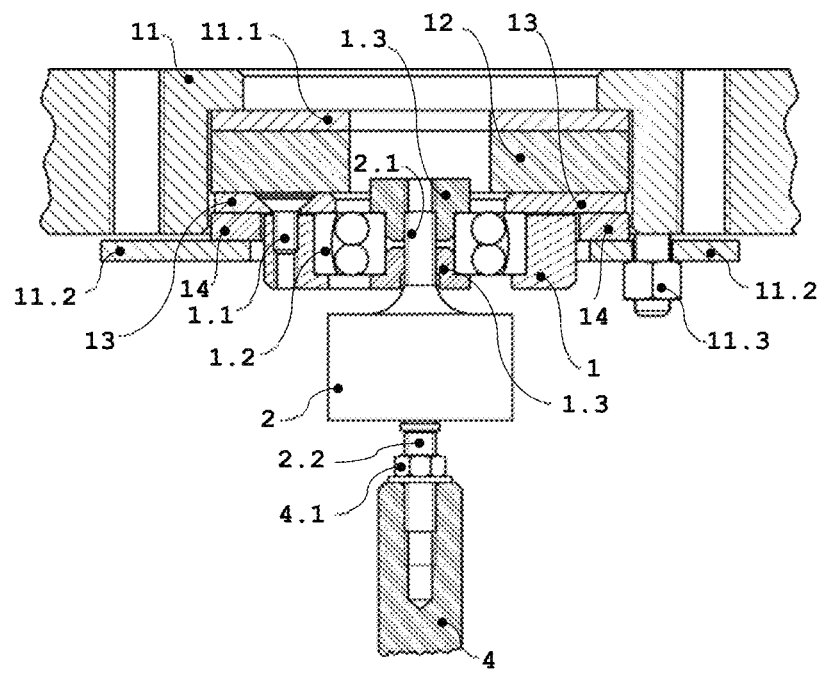
FIG. 2 depicts a section view of the connection between the actuator spindle and MDE positioned in the upper flange, which is formed using the force sensor and the spherical joint.
Figure 3:
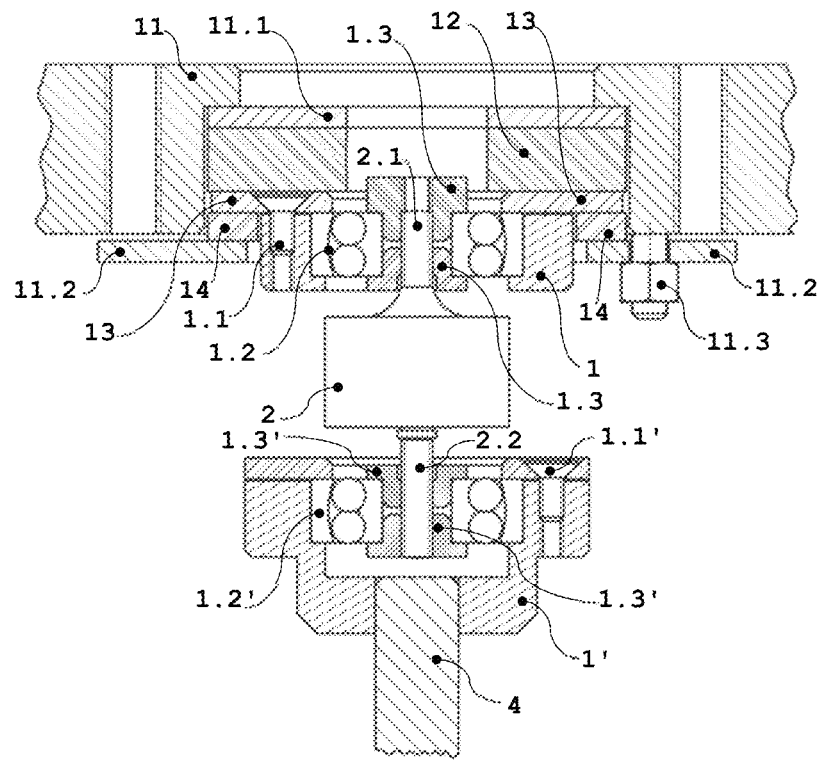
FIG. 3 depicts a section view of the connection between the actuator spindle and MDE positioned in the upper flange, which is formed using the additional spherical joint, the force sensor and the main spherical joint.

Referring now to FIG. 2 and FIG. 3, these figures may be viewed as relating to the transfer of the force from the ball screw (4) to the upper flange (11) by which one or more (e.g., two or all) of the above-discussed technical problems can be solved. FIG. 2 shows a variant with one spherical joint which will be analyzed first. Mechanical connection can be formed as follows:

ball screw (4) with nut (4.1)=>force sensor (2)=>spherical joint (1)=>MDE=>upper flange (11)

The force sensor (2) can be, as an example, a Force transducer U9C manufactured by the Hottinger Baldwin Messtechnik GmbH, DE. With its lower end or lower mounting post (2.2) it can be attached to the ball screw (4), using the thread and the nut (4.1), for instance, which may provide only translational motion of the sensor (2). On the other hand, the force sensor (2) can be with its upper side or upper mounting post (2.1) nested inside the spherical joint (1) or, to be more specific, in the rotating elements of the joint in the cup (1.3).

Spherical joint (1) can be chosen from the SR series of joints manufactured by the company Myostat Motion Control Inc., which can be characterized by high endurance and clearance measured in micrometers, and which elements of the joint in the cup (1.3) can be equipped with balls sliding inside the joint cup (1.2). Such spherical joint (1) can represent reliable mechanical connection between the force sensor (2) and the spherical joint (1) itself, where the connection can be characterized by the low friction and the negligible clearance which can prevent undesirable effects on the apparatus performance. In the variant shown in FIG. 2, spherical joint (1) can be fastened with the assembly screw (1.1) to the disc plate (13) of MDE and nowhere else. A role of the spherical joint (1) can be to cancel the negative effects of bending and torsional stress on the installed force sensor (2) in this embodiment of the apparatus according to the present disclosure.

MDE can be formed using the said disc plate (13) and two dissipative elastic elements (12, 14). According to one or more embodiments of the present disclosure, the upper dissipative element (12) and the lower dissipative element (14) can be made of polymer material, e.g., Poron XRD 12236 manufactured by the Rogers Corp. [Density—192.22 kg/m3; Hardness—19 Shore O; Compression Force Deflection—6-36 kPa; Tensile Strength—207 kPa; Tear Strength 0.9 kN/m], so that the desired damping dynamics can be achieved.

MDE can be designed in such a way that the disc plate (13) is placed between the said elastic dissipative elements (12, 14), and can act as a piston in a compressible viscous medium. Lower dissipative element (14), according to one or more embodiments of the present disclosure, can be fixed in its position in the upper flange (11) by the plate of the lower elastic dissipative element (11.2). In a similar manner, the plate of the upper elastic dissipative element (11.1) can fix the upper dissipative element (12). The clamping bolt (11.3) can be fixing all said plates (11.1, 11.2), elastic dissipative elements (12, 14), and the disc plate (13) inside the upper flange (11). A role of the entire MDE formed in this way can be to attenuate rapid changes of the contact force measured by the force sensor (2) using those two dissipative elastic elements (12, 14) which can define damping characteristics of the MDE. A set of equivalent technical solutions can be formed to be used to attenuate rapid force oscillations.

In another embodiment of the present disclosure, such as shown in FIG. 3, an additional spherical joint (1') can be placed between the ball screw (4) and the force sensor (2). For the ease of reference, all labels of that second spherical joint are additionally marked with ('). The same spherical joint (1) can be used to make connection with the upper flange (11), but that does not have to be the case in the practice. An aim of applying two spherical joints can be to additionally reduce negative effects of bending and torsional stresses, i.e., non-axial loads. In this variant, according to FIG. 3, the nut (4.1) can be replaced with a direct firm connection characterized by the rotating elements of the joint in the cup (1.3') to which the lower mounting post of the force sensor (2.2) is attached. Thereby, the following connection can be formed:

ball screw (4)=>spherical joint (1')=>force sensor (2)=>spherical joint (1)=>MDE=>upper flange (11)

The embodiment, described above, can be useful in applications with higher contact forces actively controlled in machining operation, e.g., >2 kN, in which case significant radial forces can act on the housing (20) and result in erroneous force sensor (2) readings.

In yet another embodiment according to the present disclosure, elastic elements of the guides (7.1, 7.1'), which can be build form elastomers, can be installed at the end of the sliding sections of the guides (7, 7') positioned on the opposite side of the upper flange (11). A role thereof can be to attenuate mechanical impacts each time the upper flange (11) gets to the lowest position inside the apparatus. Such undesired events can occur due to a number of unpredictable situations, among which the operator mistake is the most common one. The elastic elements (7.1, 7.1'), formed, for example, as discs, can be positioned at the sliding sections of the guides (7, 7'), at the bottom of the non-sliding sections of the guides (7, 7') fixed inside the housing (20), or at both sections of the guides (7, 7'). This way, it can be possible to achieve a longer lifetime of the apparatus during the exploitation.

EXPERIMENTAL PART

Testbed Description

The claimed characteristics of the apparatus spherical joint and MDE according to one or more embodiments of the present disclosure were confirmed with two independent experiments. Both experiments were performed using the testbed comprised of the apparatus mounted with its lower flange on the industrial robot with the handling capacity of 235 kg (ABB IRB 6640). A sanding tool is attached on the apparatus upper flange. During these experiments the tool was not rotating in order to prevent, for this experiment, unnecessary influence of tool vibrations on the measured forces. In both experiments, robot with the apparatus and a sanding tool is acting vertically towards the ground on the horizontal plate firmly attached to the steel construction fixed on the top of the external force sensor (Kistler piezoelectric dynamometer 9257B). The sensor is firmly attached to the bedplate which is directly attached to the ground.

Experiment 1

The purpose of this experiment was to analyze the influence of spherical joint and MDE in the elimination of negative influences of bending stress, i.e., non-axial loads. Sanding tool was held in the fixed position with respect to the apparatus. The robot arm performed vertical movements towards the ground by simultaneously pressing the sanding tool to the horizontal plate in 11 consecutive cycles, where each cycle was characterized by its referent vertical force value chosen from the interval—[25 N, 50 N, 75 N, 100 N, 125 N, 150 N, 125 N, 100 N, 75 N, 50 N and 25 N]. Each cycle lasted for several seconds, in order to achieve steady-state vertical force value, and then the referent force was set to the next value. In order to simulate bending stress effect, sanding tool was horizontally dislocated with respect to the center of the horizontal plate so that only 20% of the tool sanding surface was in the contact with the plate.

Four different embodiments were analyzed:
1. without spherical joint and without MDE,
2. with spherical joint and without MDE,
3. with MDE and without spherical joint, and
4. with spherical joint and with MDE.

For each embodiment three repeated measurements were performed. Results are presented in Tables 1~4 in the form of mean values of axial forces measured by the apparatus sensor ($F_A$), vertical ($F_Z$) and resultant ($F_R$) forces measured by the external sensor, and the absolute differences between the forces measured by the external force sensor and the apparatus force sensor ($|F_Z-F_A|$). The purpose of measuring $F_R$ force is to verify that external force sensor is always loaded orthogonally ($F_Z=F_R$), i.e., that $F_Z$ is an actual force acting axially on the apparatus. Since the apparatus force control loop was active, measured axial $F_A$ force was under the influence of that loop, i.e., its steady-state value was always close to the force reference value irrespective of the type of loads that were acting on the apparatus.

In the case when the apparatus is loaded only in the axial direction, the vertical force measured by the external sensor should be equal to the axial force measured by the apparatus sensor. If vertical force measured by the external sensor is different than the axial force measured by the apparatus sensor it is a clear indication of the negative influence of non-axial force components on the tool and the apparatus, which apparatus force sensor cannot eliminate by itself.

The apparatus embodiment without spherical joint and without MDE (Table 1) has shown the highest mean value of the absolute differences between the actual vertical force and the axial force measured with the apparatus force sensor—$\overline{|F_Z-F_A|}$ ($\pm$SD)=9.08 N ($\pm$2.14 N), which is calculated from the values presented in the last column of Table 1. When using only spherical joint (Table 2), the mean value of the absolute force differences, calculated from the values presented in the last column of Table 2, reduced to $\overline{|F_Z-F_A|}$ ($\pm$SD)=5.77 N ($\pm$1.88 N). The apparatus embodiment with only MDE (Table 3) has shown even better result—$\overline{|F_Z-F_A|}$ ($\pm$SD)=2.67 N ($\pm$1.19 N), where the mean of the absolute force differences was calculated from the values presented in the last column of Table 3. This result can be explained by the positive mechanical characteristics of the polymer material from which lower and upper dissipative elements of MDE are made of, i.e., by the material deformation characteristics in all directions responsible for partial compensation of the negative impact of non-axial loads. However, this experiment was performed under, practically, static load of the apparatus. In the case of dynamic loads, MDE reduces response dynamic of the control loop due to its attenuation characteristics, and suffer from fatigue over time, which is not the case with the spherical joint. In the case when the said MDE is coupled with the spherical joint, the lowest mean value of the absolute force differences, calculated form the figures presented in the last column of Table 4, is achieved—$\overline{|F_Z-F_A|}$ (+SD)=1.45 N ($\pm$0.49 N).

These results confirm significant reduction of the influence of the bending stress, which is necessary to achieve precise contact force control within 2 N tolerance. In addition, these results clearly prove synergistic effect of the spherical joint and MDE in the compensation of non-axial loads.

It should be noted that the presented results are accomplished using the apparatus embodiment of the present disclosure which is relatively robustly constructed using three guides, each 16 mm in a diameter. In the case of reduced number of guides, their diameters or some other mechanical modifications which would reduce apparatus stiffness, can be seamlessly realized according to the role(s) of spherical joint and MDE in the compensation of non-axial loads.

TABLE 1

Forces achieved using the apparatus embodiment without spherical joint and without MDE

| $F_{REF}$, N | Apparatus force sensor Mean $F_A$ ($\pm$SD), N | External (testbed) force sensor Mean $F_Z$ ($\pm$SD), N | Mean $F_R$ ($\pm$SD), N | $|F_Z - F_A|$, N |
|---|---|---|---|---|
| 25 | 24.00 ($\pm$0.02) | 17.76 ($\pm$0.29) | 19.31 ($\pm$0.38) | 6.24 |
| 50 | 49.00 ($\pm$0.02) | 41.13 ($\pm$0.52) | 42.59 ($\pm$0.63) | 7.87 |
| 75 | 74.01 ($\pm$0.02) | 64.42 ($\pm$0.46) | 65.44 ($\pm$0.54) | 9.59 |
| 100 | 99.00 ($\pm$0.02) | 88.38 ($\pm$0.49) | 89.04 ($\pm$0.54) | 10.62 |
| 125 | 124.01 ($\pm$0.02) | 112.48 ($\pm$0.61) | 112.93 ($\pm$0.65) | 11.53 |
| 150 | 149.01 ($\pm$0.02) | 136.69 ($\pm$0.48) | 137.05 ($\pm$0.51) | 12.32 |
| 125 | 125.67 ($\pm$0.24) | 115.32 ($\pm$0.64) | 115.75 ($\pm$0.67) | 10.35 |
| 100 | 100.98 ($\pm$0.02) | 91.53 ($\pm$0.61) | 92.15 ($\pm$0.68) | 9.45 |
| 75 | 75.99 ($\pm$0.02) | 67.28 ($\pm$0.55) | 68.20 ($\pm$0.63) | 8.71 |
| 50 | 50.99 ($\pm$0.03) | 43.10 ($\pm$0.68) | 44.42 ($\pm$0.79) | 7.89 |
| 25 | 26.00 ($\pm$0.02) | 20.65 ($\pm$0.61) | 21.39 ($\pm$0.61) | 5.35 |

TABLE 2

Forces achieved using the apparatus embodiment with spherical joint and without MDE

| $F_{REF}$, N | Apparatus force sensor Mean $F_A$ ($\pm$SD), N | External (testbed) force sensor Mean $F_Z$ ($\pm$SD), N | Mean $F_R$ ($\pm$SD), N | $|F_Z - F_A|$, N |
|---|---|---|---|---|
| 25 | 24.00 ($\pm$0.02) | 20.22 ($\pm$0.83) | 21.92 ($\pm$0.62) | 3.78 |
| 50 | 49.00 ($\pm$0.02) | 44.05 ($\pm$1.34) | 45.39 ($\pm$1.21) | 4.95 |
| 75 | 74.00 ($\pm$0.02) | 67.73 ($\pm$1.21) | 68.55 ($\pm$1.13) | 6.27 |
| 100 | 99.00 ($\pm$0.02) | 91.66 ($\pm$1.45) | 92.12 ($\pm$1.39) | 7.34 |
| 125 | 124.00 ($\pm$0.02) | 116.47 ($\pm$0.55) | 116.69 ($\pm$0.52) | 7.53 |
| 150 | 149.00 ($\pm$0.02) | 139.75 ($\pm$0.66) | 139.86 ($\pm$0.64) | 9.25 |
| 125 | 125.86 ($\pm$0.13) | 119.14 ($\pm$0.62) | 119.39 ($\pm$0.58) | 6.72 |
| 100 | 100.98 ($\pm$0.03) | 95.35 ($\pm$0.57) | 95.78 ($\pm$0.51) | 5.63 |
| 75 | 75.98 ($\pm$0.03) | 70.79 ($\pm$0.89) | 71.56 ($\pm$0.81) | 5.19 |
| 50 | 51.00 ($\pm$0.02) | 47.06 ($\pm$0.81) | 48.26 ($\pm$0.71) | 3.94 |
| 25 | 26.00 ($\pm$0.02) | 23.13 ($\pm$0.83) | 23.66 ($\pm$0.98) | 2.87 |

TABLE 3

Forces achieved using the apparatus embodiment with MDE and without spherical joint

| $F_{REF}$, N | Apparatus force sensor Mean $F_A$ ($\pm$SD), N | External (testbed) force sensor Mean $F_Z$ ($\pm$SD), N | Mean $F_R$ ($\pm$SD), N | $|F_Z - F_A|$, N |
|---|---|---|---|---|
| 25 | 23.99 ($\pm$0.02) | 21.50 ($\pm$0.93) | 24.08 ($\pm$0.98) | 2.49 |
| 50 | 49.00 ($\pm$0.02) | 46.43 ($\pm$0.95) | 48.45 ($\pm$0.98) | 2.57 |
| 75 | 74.01 ($\pm$0.02) | 70.73 ($\pm$0.65) | 71.95 ($\pm$0.71) | 3.28 |
| 100 | 99.01 ($\pm$0.02) | 95.59 ($\pm$0.91) | 96.27 ($\pm$0.95) | 3.42 |
| 125 | 124.01 ($\pm$0.02) | 119.91 ($\pm$0.89) | 120.24 ($\pm$0.90) | 4.10 |
| 150 | 149.01 ($\pm$0.02) | 145.11 ($\pm$0.88) | 145.26 ($\pm$0.90) | 3.90 |
| 125 | 125.95 ($\pm$0.04) | 122.63 ($\pm$0.84) | 122.94 ($\pm$0.85) | 3.32 |
| 100 | 100.97 ($\pm$0.03) | 98.03 ($\pm$1.00) | 98.65 ($\pm$1.02) | 2.94 |
| 75 | 75.99 ($\pm$0.03) | 73.89 ($\pm$0.94) | 74.97 ($\pm$0.94) | 2.10 |
| 50 | 50.98 ($\pm$0.03) | 49.88 ($\pm$1.08) | 51.58 ($\pm$1.04) | 1.10 |
| 25 | 26.00 ($\pm$0.02) | 25.89 ($\pm$1.02) | 26.67 ($\pm$0.83) | 0.11 |

TABLE 4

Forces achieved using the apparatus embodiment with spherical joint and with MDE

| $F_{REF}$, N | Apparatus force sensor Mean $F_A$ (±SD), N | External (testbed) force sensor Mean $F_Z$ (±SD), N | Mean $F_R$ (±SD), N | $|F_Z - F_A|$, N |
|---|---|---|---|---|
| 25 | 24.01 (±0.02) | 22.80 (±0.41) | 24.02 (±0.41) | 1.21 |
| 50 | 49.01 (±0.02) | 47.56 (±0.51) | 48.21 (±0.51) | 1.45 |
| 75 | 74.02 (±0.03) | 72.08 (±0.50) | 72.33 (±0.51) | 1.94 |
| 100 | 99.01 (±0.02) | 97.18 (±0.62) | 97.25 (±0.62) | 1.83 |
| 125 | 124.01 (±0.02) | 122.00 (±0.73) | 122.03 (±0.73) | 2.01 |
| 150 | 149.01 (±0.02) | 147.05 (±0.80) | 147.07 (±0.80) | 1.96 |
| 125 | 125.91 (±0.07) | 124.70 (±0.58) | 124.72 (±0.59) | 1.21 |
| 100 | 100.97 (±0.03) | 99.57 (±0.71) | 99.62 (±0.71) | 1.40 |
| 75 | 75.98 (±0.03) | 74.34 (±0.72) | 74.49 (±0.72) | 1.64 |
| 50 | 50.98 (±0.04) | 50.27 (±0.64) | 50.62 (±0.64) | 0.71 |
| 25 | 25.99 (±0.02) | 25.39 (±1.03) | 25.51 (±1.04) | 0.60 |

Experiment 2

The purpose of this experiment was to analyze the influence of MDE, as well as the spherical joint, in mechanical attenuation of rapid axial force changes and, thereby, in the prevention of the system oscillations. In this experiment, sanding tool was vertically aligned with the center of the horizontal plate, thus enabling contact of the entire tool sanding surface with the plate. In order to exclude the influence of the apparatus main control logic, i.e., controller parameters adjusted according to the physical parameters of the apparatus, on the quality of the system response, force control loop was deactivated, and the apparatus upper flange or tool movement was controlled within the speed control loop by the current saturated to the predefined safety value.

The robot arm positioned the apparatus, i.e., the tool sanding surface 60 mm above the horizontal plate. The apparatus servomotor speed control loop controlled the motion of the tool which started to move towards the horizontal plate and collide with it with the constant speed of 150 mm/s, thus simulating the tool-workpiece impact in the form of the step function. After the impact, the tool remained in its contact position with the plate for approximately 2 s until the steady-state is reached, and then it was vertically moved up using the apparatus servomotor to the initial position of the 60 mm above the plate. For each of the three apparatus embodiments—without spherical joint and MDE, with MDE, with spherical joint and MDE the said cycle was repeated 10 times continuously. Vertical forces were measured by using only external sensor since apparatus sensor was deactivated.

Results are presented in Table 5 in the form of two standard time-domain parameters—overshoot and settling time. Settling time was calculated based on the condition that the response force curve reached and stayed within a range of ±1% of the final force value, i.e., approximately in the range of ±1.6 N. The peak force values ($F_z$) were between 500 N and 550 N. Results indicate that the highest overshoot and settling time is observed with the apparatus embodiment formed without MDE and spherical joint. The embodiment formed with MDE expectedly achieved the lowest overshoot and shorter settling time. Implementation of the spherical joint to the said embodiment, expectedly, but slightly and acceptably deteriorated overshoot characteristics of the apparatus, while, at the same time, it had no negative influences on the settling time.

TABLE 5

Time-domain characteristics of three different apparatus embodiments

| Apparatus embodiment | Overshoot, % Mean (±SD) | Settling time, s Mean (±SD) |
|---|---|---|
| No MDE and no spherical joint | 250.84 (±2.45) | 1.71 (±0.015) |
| Only MDE | 212.57 (±5.14) | 1.55 (±0.002) |
| MDE and spherical joint | 220.00 (±1.84) | 1.41 (±0.008) |

INDUSTRIAL APPLICABILITY

The industrial applicability of one or more embodiments of the present disclosure can enable utilization of linear electric actuators in an apparatus for the active control of the contact force in machining and handling operations which may have been, until now, used in real industrial applications only in the form of pneumatic systems due to the undesired oscillatory responses of the control loop.

REFERENCES AND ABBREVIATIONS 1, 1' Spherical joint
1.1, 1.1' Assembly screw
1.2, 1.2' Joint cup
1.3, 1.3' Rotating elements of the joint in the cup
2 Force sensor
2.1 Upper mounting post of the force sensor
2.2 Lower mounting post of the force sensor
3 Ball screw lever
3.1 Sliding joint
4 Ball screw
4.1 Nut
5 Ball screw nut
6 Servomotor rotor
7, 7' Linear guide
7.1, 7.1' Elastic element of the guide
8 Servomotor with the hollow shaft
9 Servomotor encoder or resolver
10 Lower flange for axial mounting of the apparatus to the multi-axis machine
11 Upper flange for axial mounting of the tool to the apparatus
11.1 Plate of the upper elastic dissipative element
11.2 Plate of the lower elastic dissipative element
11.3 Clamping bolt
12 Upper elastic dissipative element
13 Disc plate
14 Lower elastic dissipative element
15 Inertial measurement unit
20 Housing
MDE Mechanical dissipative element

The invention claimed is:

1. An apparatus for active contact force control in machining and handling operations comprising:
  an upper flange to mount a production tool to the apparatus, where, when mounted, the production tool acts with a predefined contact force on a workpiece surface in a production process;
  a lower flange on a housing of the apparatus to mount the apparatus via the lower flange on a multi-axis machine which performs a spatial motion of the apparatus and the production tool when mounted to the upper flange of the apparatus; and a linear actuator in the housing, the linear actuator including a ball screw and at least one ball screw lever connected as a sliding joint to at least one linear guide having a first end portion in the housing, where the at least one linear guide limits motion of the ball screw only for axial motion along a linear axis of the linear actuator, and where the at least one linear guide has a second end portion that is connected, according to a first mechanical connection, to the upper flange, wherein the ball screw and the upper flange are connected according to a second mechanical connection that includes a force sensor configured to measure force by which the linear actuator is acting on the upper flange and thereby on the production tool, wherein the second mechanical connection between the ball screw and the upper flange includes at least a first spherical joint and a mechanical dissipative element between the force sensor and the upper flange, where the first spherical joint is configured to eliminate any non-axial load, and wherein the mechanical dissipative element includes an upper elastic dissipator and a lower elastic dissipator, with a disc plate between the upper and lower elastic dissipators, where the upper and lower elastic dissipators are fixed within the upper flange such that the disc plate forms a mechanical connection between the force sensor and the upper flange via the first spherical joint, and where the upper and lower elastic dissipators mechanically attenuate changes in contact force measured by the force sensor.

2. The apparatus for active contact force control in machining and handling operations according to claim 1, further comprising an inertial measurement unit, attached to the housing, configured to provide readings of housing orientation in real-time.

3. The apparatus for active contact force control in machining and handling operations according to claim 1, wherein the ball screw is directly connected to the force sensor, and wherein the lower flange and an additional flange are configured such that a third mechanical connection with the multi-axis machine is accomplished with a predefined mounting angle between a main axis of the apparatus and a surface of the multi-axis machine.

4. The apparatus for active contact force control in machining and handling operations according to claim 1, wherein the linear actuator includes an axially positioned servomotor which is equipped with an encoder and/or resolver to determine position and rotational speed of a servomotor rotor, where the servomotor rotor is mechanically connected to an assembly comprised of a ball screw nut and the ball screw inserted into the ball screw nut, and where the ball screw and the ball screw nut transform rotational motion of the servomotor rotor into a linear motion of the ball screw inside the ball screw nut to enable direct control of the contact force on the upper flange.

5. The apparatus for active contact force control in machining and handling operations according to claim 4, wherein the servomotor is mechanically connected to the assembly comprised of the ball screw and the ball screw nut which is configured to enable electrical wiring and/or hydraulic installations to be guided thereto.

6. The apparatus for active contact force control in machining and handling operations according to claim 1, wherein the second mechanical connection includes the first spherical joint and a second spherical joint between the force sensor and the ball screw, wherein the first and second spherical joints are configured to eliminate any of the non-axial load, and wherein the lower flange and an additional flange are configured such that a third mechanical connection with the multi-axis machine is accomplished with a predefined mounting angle between a main axis of the apparatus and a surface of the multi-axis machine.

7. The apparatus for active contact force control in machining and handling operations according to claim 1, wherein the multi-axis machine is a numerically controlled machine tool, a robot, or a manipulator.

8. A method comprising:

providing an apparatus for active contact force control, the apparatus including:

an upper flange to mount a production tool to the apparatus, where, when mounted, the production tool acts with a predefined contact force on a workpiece surface in a production process;

a lower flange on a housing of the apparatus to mount the apparatus via the lower flange on a multi-axis machine which performs a spatial motion of the apparatus and the production tool when mounted to the lower flange of the apparatus; and a linear actuator in the housing, the linear actuator including a ball screw and at least one ball screw lever connected as a sliding joint to at least one linear guide having a first end portion in the housing, where the at least one linear guide limits motion of the ball screw only for axial motion along a linear axis of the linear actuator, and where the at least one linear guide has a second end portion that is connected, according to a first mechanical connection, to the upper flange, wherein the ball screw and the upper flange are connected according to a second mechanical connection that includes a force sensor to measure force by which the linear actuator is acting on the upper flange and thereby on the production tool, wherein the second mechanical connection between the ball screw and the upper flange is formed of a first spherical joint and a mechanical dissipative element between the force sensor and the upper flange, where the first spherical joint is configured to eliminate any non-axial load, and wherein the mechanical dissipative element includes an upper elastic dissipator and a lower elastic dissipator, with a disc plate between the upper and lower elastic dissipators, where the upper and lower elastic dissipators are fixed within the upper flange such that the disc plate forms a mechanical connection between the force sensor and the upper flange via the first spherical joint, and where the upper and lower elastic dissipators mechanically attenuate changes in contact force measured by the force sensor; and using the apparatus in the production process, wherein the production tool belongs to a group comprised of: a polishing tool, a grinding tool, a drilling tool, a milling tool, a sanding tool, a handling tool, or a tool used in electrochemical machining.

9. The method according to claim 8, wherein the multi-axis machine is a numerically controlled machine tool, a robot, or a manipulator.

10. The method according to claim 8, wherein the apparatus further includes an inertial measurement unit, attached to the housing, configured to provide readings of housing orientation in real-time.

11. The method according to claim 8,
wherein the ball screw is directly connected to the force sensor, and
wherein the lower flange and an additional flange are configured such that a third mechanical connection with the multi-axis machine is accomplished with a predefined mounting angle between a main axis of the apparatus and a surface of the multi-axis machine.

12. The method according to claim 8, wherein the linear actuator includes an axially positioned servomotor which is equipped with an encoder and/or resolver to determine position and rotational speed of a servomotor rotor, where the servomotor rotor is mechanically connected to an assembly comprised of a ball screw nut and the ball screw inserted into the ball screw nut, and where the ball screw and the ball screw nut transform rotational motion of the servomotor rotor into a linear motion of the ball screw inside the ball screw nut to enable direct control of the contact force on the upper flange.

13. The method according to claim 12, wherein the servomotor is mechanically connected to the assembly comprised of the ball screw and the ball screw nut which is configured to enable electrical wiring and/or hydraulic installations to be guided thereto.

14. The method according to claim 8, wherein the second mechanical connection includes the first spherical joint and a second spherical joint between the ball screw and the first spherical joint.

15. A system for active contact force control in machining and handling operations comprising:
an upper flange to mount a production tool to the apparatus, where, when mounted, the production tool acts with a predefined contact force on a workpiece surface in a production process;
a lower flange on a housing of the apparatus to mount the apparatus via the lower flange on a multi-axis machine which performs a spatial motion of the apparatus and the production tool when mounted to the upper flange of the apparatus; and
a linear actuator in the housing, the linear actuator including a ball screw and at least one ball screw lever connected as a sliding joint to at least one linear guide having a first end portion in the housing, where the at least one linear guide limits motion of the ball screw only for axial motion along a linear axis of the linear actuator, and where the at least one linear guide has a second end portion that is connected, according to a first mechanical connection, to the upper flange,
wherein the ball screw and the upper flange are connected according to a second mechanical connection that includes a force sensor configured to measure force by which the linear actuator is acting on the upper flange and thereby on the production tool,
wherein the second mechanical connection between the ball screw and the upper flange includes at least a first spherical joint and a mechanical dissipative element between the force sensor and the upper flange, and is adapted to include a second spherical joint between the force sensor and the ball screw, where the first spherical joint is configured to eliminate non-axial load, and
wherein the mechanical dissipative element includes an upper elastic dissipator and a lower elastic dissipator, with a disc plate between the upper and lower elastic dissipators, where the upper and lower elastic dissipators are fixed within the upper flange such that the disc plate forms a mechanical connection between the force sensor and the upper flange via the first spherical joint, and where the upper and lower elastic dissipators mechanically attenuate changes in contact force measured by the force sensor.

16. The system for active contact force control in machining and handling operations according to claim 15, further comprising an inertial measurement unit configured to provide readings of housing orientation in real-time.

17. The system for active contact force control in machining and handling operations according to claim 15, wherein the linear actuator includes an axially positioned servomotor which is equipped with an encoder and/or resolver to determine position and rotational speed of a servomotor rotor, where the servomotor rotor is mechanically connected to an assembly comprised of a ball screw nut and the ball screw inserted into the ball screw nut, and where the ball screw and the ball screw nut transform rotational motion of the servomotor rotor into a linear motion of the ball screw inside the ball screw nut to enable direct control of the contact force on the upper flange.

18. The system for active contact force control in machining and handling operations according to claim 17, wherein the servomotor is mechanically connected to the assembly comprised of the ball screw and the ball screw nut which is configured to enable electrical wiring and/or hydraulic installations to be guided thereto.

19. The system for active contact force control in machining and handling operations according to claim 15,
wherein the second mechanical connection includes the first spherical joint and the second spherical joint,
wherein the first and second spherical joints are configured to eliminate any of the non-axial load, and
wherein the lower flange and an additional flange are configured such that a third mechanical connection with the multi-axis machine is accomplished with a predefined mounting angle between a main axis of the apparatus and a surface of the multi-axis machine.

20. The system for active contact force control in machining and handling operations according to claim 15, wherein the multi-axis machine is a numerically controlled machine tool, a robot, or a manipulator.

* * * * *